UNITED STATES PATENT OFFICE.

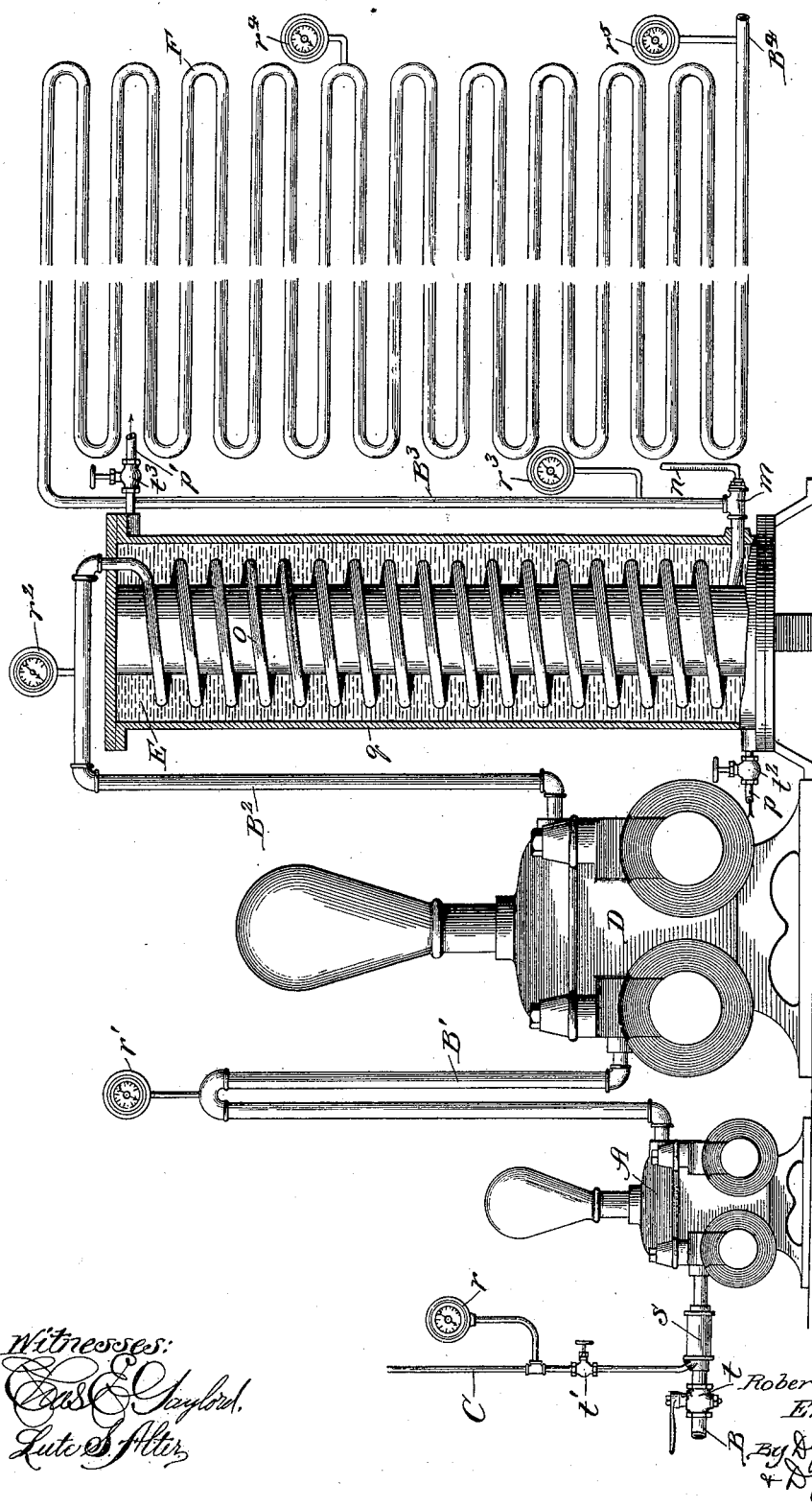

ROBERT F. HEROLD, OF ST. LOUIS, MISSOURI, AND EMIL F. HAAS, OF NEW YORK, N. Y.

APPARATUS FOR CARBONATING BEVERAGES.

SPECIFICATION forming part of Letters Patent No. 651,039, dated June 5, 1900.

Application filed May 18, 1899. Serial No. 717,245. (No model.)

*To all whom it may concern:*

Be it known that we, ROBERT F. HEROLD, a citizen of the United States, residing at St. Louis, in the State of Missouri, and EMIL F. HAAS, a subject of the Emperor of Germany, residing at the city of New York, county and State of New York, have invented a new and useful Improvement in Apparatus for Carbonating Beverages, of which the following is a specification.

Our invention relates to certain improvements in apparatus for carrying into effect the process of carbonating beverages for which we filed application for Letters Patent on the 13th day of December, 1897, Serial No. 661,678. That process consists, essentially, in charging the beverage with the required quantity of carbonic-acid gas, then subjecting the charged beverage to a pressure sufficient to liquefy carbonic-acid gas in a free state at the subsisting temperature, then cooling the beverage to abstract the heat of compression, and finally reducing the pressure to the desired ultimate pressure. In view of the requirements of the process it is essential that the apparatus for carrying it into effect shall embody means for charging the beverage with the requisite quantity of carbonic-acid gas, means for exerting the required compression upon the charged beverage, means for cooling it after it has been compressed, and means for reducing the pressure to the required degree, and such an apparatus is illustrated partly in elevation and partly in section in the accompanying drawing.

For the purposes of this description we shall hereinafter assume the beverage treated to be beer.

In the drawing, A is an initial compressor-pump wherein the beer and gas previously commingled are initially compressed. The beer enters this compressor-pump from the source of supply through the pipe B, having a valve $t$ and a glass section $s$ between the valve $t$ and the compressor-pump A. The carbonic-acid gas is led into the pipe B between the valve $t$ and the glass section $s$ by means of a pipe C, communicating with a carbonic-acid-gas reservoir and provided with a valve $t'$ and a pressure-gage $r$. With this arrangement of the parts the mixing of the beer and carbonic-acid gas can be observed in the transparent section $s$ and the flow of each regulated as required. It is desirable to have the end of the pipe C where it enters the pipe B deflected in the direction of the beer-flow, so that the mixing shall occur with the gas and beer flowing in the same direction. From the initial compressor A the beer is delivered by means of the pipe B' to the final compressor D, in which the commingled beer and gas are subjected to such a pressure as would liquefy carbonic-acid gas in a free state, or approximately such a pressure. The pipe B is preferably vertically looped, as shown, and it is provided at its upper bend with a pressure-gage $r'$. From the final compressor D the commingled beer and gas flow through the pipe $B^2$ to the cooler E, which consists of a receptacle $q$ for brine or for ammonia or other liquefied-gas expansion, provided at its lower end with a pipe $p$, having a valve $t^2$ and a corresponding valved pipe $p'$ $t^3$ at the upper end for the circulation of the brine or ammonia or other gas through the receptacle from a suitable reservoir and a coil $o$, inclosed within the brine or gas receptacle and communicating at one end with the pipe $B^2$ and at the other end with a pipe $B^3$, leading to the pressure-reducer F, which may be in the form of a convoluted continuation of the pipe $B^3$, as shown. The coil $o$ and pipe $B^3$, in addition to their other functions, form part of the pressure-reducer, and the pipe $B^2$ may also be included in the pressure-reducing system. At about the junction of the coil $o$ with the pipe $B^3$ a thermometer $n$ is provided, and for this purpose we provide the T-coupling $m$, into one branch of which the thermometer extends, as indicated. The pressure-reducer terminates in a pipe $B^4$, which leads to a receptacle (not shown) in which the carbonated beer is to be stored. In order that the pressure of the beer may be determined at various points in its progress, the pipe $B^2$, near where it leads to the cooler E, is provided with a pressure-gage $r^2$. The pipe $B^3$, near its lower end, is provided with a pressure-gage $r^3$. The pressure-reducer is provided with a pressure-gage $r^4$ about midway of its height, and the pipe $B^4$ is provided with a pressure-gage $r^5$, the last indicating the pressure of the beer as it leaves the pressure-reducer.

Carbonic-acid gas at a temperature of 32° Fahrenheit liquefies at a pressure of about five hundred and twenty-nine and one-half pounds to the square inch, and it is intended that the compressor D shall be adapted to exert this pressure or a higher pressure upon the charged beer. It is not absolutely necessary, however, that the charged beer shall be subjected in the compressor to the full extent of pressure which would serve to liquefy free carbonic-acid gas at the subsisting temperature, because if this pressure is approximately attained there it may be aided by the cooler E, and the same effect thereby produced as if the pressure had been somewhat higher or the temperature of the beer somewhat lower at the compressor D. In other words, it is essential that by the combined influence of the compressor and cooler the charged beer shall be subjected to at least such a pressure as would liquefy free carbonic-acid gas, and of course the usual practice of cooling the beer to a low temperature before it is commingled with the gas is to be followed.

Beer carbonated by means of the apparatus above described shows the same intimate association between the gas and the beverage as exists when natural impregnation is employed, and thus by means of our apparatus all the objections which have heretofore attached to artificial charging are overcome.

As a rule we pass the beer through a filter before it is commingled with carbonic-acid gas, whereby we obtain the advantage of clarifying it while it is in a still condition. If desired, however, the filtration may take place after the beer leaves the pressure-reducer.

What we claim as new, and desire to secure by Letters Patent, is—

1. In an apparatus for carbonating beverages, the combination with a preliminary carbonating device, of a compressor adapted to subject the carbonated beverage to a pressure sufficient to liquefy free carbonic-acid gas at the subsisting temperature, and a pressure-reducing device for reducing the pressure upon the beverage after it leaves the compressor, substantially as described.

2. In an apparatus for carbonating beverages, the combination of a mixing device for the liquid and gas, a compressor into which the charged liquid passes, adapted to subject the same to a pressure sufficient to liquefy free carbonic-acid gas at the subsisting temperature, a cooler through which the charged liquid passes after leaving the compressor, and a pressure-reducer through which the charged liquid passes after leaving the cooler, substantially as described.

3. In an apparatus for carbonating beverages, the combination with a compressor for liquid, adapted to subject it to a pressure sufficient to liquefy free carbonic-acid gas at the subsisting temperature, of a valved liquid-conduit B entering the compressor and provided with a glass section $s$, a valved gas-conduit leading into the liquid-conduit toward the entrance end of the glass section, a cooler into which the charged liquid passes after leaving the compressor, and a pressure-reducer through which the charged liquid passes after leaving the cooler, substantially as described.

4. In an apparatus for carbonating beverages, the combination of a mixer for charging the liquid with carbonic-acid gas, an initial compressor A into which the charged liquid passes and wherein it is preliminarily compressed, a final compressor D into which the charged liquid passes from the initial compressor and which is adapted to subject it to a pressure sufficient to liquefy free carbonic-acid gas at the subsisting temperature, a cooler through which the charged liquid passes after leaving the final compressor, and a pressure-reducer through which the charged liquid passes after leaving the cooler, substantially as described.

5. In an apparatus for carbonating beverages, the combination with the valved liquid-conduit B provided with a glass section $s$, of a valved gas-conduit C entering the liquid-conduit toward the entrance end of the glass section, an initial compressor A into which the charged liquid passes from the conduit B and wherein it is preliminarily compressed, a final liquid-compressor D which receives the charged liquid from the initial compressor, and wherein it is further compressed, a cooler through which the charged liquid passes after leaving the final compressor, and a pressure-reducer through which the charged liquid passes after leaving the cooler, substantially as described.

6. In an apparatus for carbonating beverages, the combination of the valved liquid-conduit B provided with the glass section $s$, valved gas-conduit C provided with the pressure-gage $r$ and leading into the liquid-conduit toward the entrance end of the glass section, initial compressor A into which the liquid-conduit B leads and wherein the charged liquid is preliminarily compressed, final compressor D connected with the initial compressor by the vertically-looped pipe B' provided at its upper bend with a pressure-gage $r'$, cooler E connected with the final compressor D by means of the pipe $B^2$ provided with a pressure-gage $r^2$, pipe $B^3$ leading from the final compressor and provided with the thermometer $n$ and pressure-gage $r^3$, and pressure-reducer F, connected with the pipe $B^3$ and provided with a pressure-gage $r^4$, and having a pressure-gage $r^5$ upon its outlet, substantially as described.

ROBERT F. HEROLD.
EMIL F. HAAS.

Witnesses as to Robert F. Herold:
EDMUND STUKENBERG,
CHAS. BARTLING.
Witnesses as to Emil F. Haas:
ANTON JOSEPH HECKER,
ANTHONY J. MCCARTY.